(12) United States Patent
Grier et al.

(10) Patent No.: US 7,324,282 B2
(45) Date of Patent: Jan. 29, 2008

(54) APPARATUS, SYSTEM AND METHOD FOR APPLYING OPTICAL GRADIENT FORCES

(75) Inventors: David Grier, Chicago, IL (US); Ward Lopes, Chicago, IL (US); Eric Dufresne, Cambridge, MA (US)

(73) Assignee: Arryx, Inc., Chicago, IL (US)

( * ) Notice: Subject to any disclaimer, the term of this patent is extended or adjusted under 35 U.S.C. 154(b) by 10 days.

(21) Appl. No.: 10/701,324

(22) Filed: Nov. 4, 2003

(65) Prior Publication Data
US 2004/0207922 A1 Oct. 21, 2004

Related U.S. Application Data (63) Continuation of application No. PCT/US02/15351, filed on May 14, 2002.

(51) Int. Cl.
*G02B 5/18* (2006.01)
(52) U.S. Cl. .................. 359/573; 359/434; 359/566
(58) Field of Classification Search ............... 359/614, 359/556, 615, 601, 434, 573
See application file for complete search history.

(56) References Cited

U.S. PATENT DOCUMENTS

| | | | |
|---|---|---|---|
| 5,939,716 | A | 8/1999 | Neal et al. |
| 6,055,106 | A | 4/2000 | Grier et al. |
| 6,416,190 | B1 | 7/2002 | Grier |

FOREIGN PATENT DOCUMENTS

JP   H06-123886 A   8/1994

OTHER PUBLICATIONS

J. Liesener et al. (2000). "Multi-functional optical tweezers using computer-generated holograms". Optics Communications, vol. 185, 77-82.
Paul C. Morgensen et al. (2000). "Dynamic array generation and pattern formation for optical tweezers". Optics Communications, vol. 175, 75-81.
Eric R. Dufresne et al. (1998). "Optical tweezer arrays and optical substrate created with diffractive optics". Review of Scientific Instruments, vol. 69 (5), 1974-1977.
Eric R. Dufresne et al. (2001). "Computer-generated holographic optical tweezer arrays". Review of Scientific Instruments, vol. 72 (3), 1810-1816.

*Primary Examiner*—Joshua L Pritchett
(74) *Attorney, Agent, or Firm*—Akerman Senterfitt; Jean C. Edwards, Esq.

(57) ABSTRACT

The present invention relates to a system of applying optical gradient forces to form a plurality of optical traps to manipulate small particles. The system includes a light source for generating a focused beam of light which is directed along an optical axis though a phase patterning optical element having a variable optical surface and which has a virtual lens encoded thereon. The optical element produces a plurality of beamlets that are coverged at a position between the optical element and a single transfer lens, and directed through the transfer lens to overlap at the back aperture of a focusing lens. The focusing lens coverges the beamlets to form a plurality of optical traps in the working focal region where particles to be examined, manipulated, or measured, are disposed.

119 Claims, 4 Drawing Sheets

FIG. 1A

Working Focal Region

APPARATUS, SYSTEM AND METHOD FOR APPLYING OPTICAL GRADIENT FORCES

This application is a continuation of International Patent Application No. PCT/US02/15351, filed May 14, 2002, which claims priority from U.S. patent application Ser. No. 09/855,995, filed May 14, 2001, the contents of which are incorporated by reference to the extent permitted by law.

BACKGROUND OF THE INVENTION

Throughout this application various publications are referenced. The disclosures of these publications in their entireties are hereby incorporated by reference in this application in order to more fully describe the state of the art to which this invention pertains.

1. Field of the Invention

The present invention relates generally to optical traps. In particular, the invention relates to an apparatus, system and method for applying optical gradient forces to form a plurality of optical traps to manipulate small particles.

2. Discussion of the Related Arts

An optical tweezer is an optical tool which utilizes the gradient forces of a focused beam of light to manipulate particles with dielectric constants higher than the surrounding media. To minimize its energy such particles will move to the region where the electric field is the highest. Stated in terms of momentum, the focused beam of light produces radiation pressure, creating small forces by absorption, reflection, diffraction or refraction of the light by a particle. The forces generated by radiation pressure are almost negligible—a light source, such as a diode-pumped Nd:YAG laser operating at 10 mW, will only produce a few picoNewtons. However, a few picoNewtons of force is sufficient to manipulate small particles.

Other optical tools which can be used to manipulate small particles include, but are not limited to, optical vortices, optical bottles, optical rotators and light cages. An optical vortex, although similar in use to an optical tweezer, operates on an opposite principle. An optical vortex produces a gradient surrounding an area of zero electric field which is useful to manipulate particles with dielectric constants lower than the surrounding media or which are reflective, or other types of particles which are repelled by an optical tweezer. To minimize its energy such a particle will move to the region where the electric field is the lowest, namely the zero electric field area at the focal point of an appropriately shaped laser beam. The optical vortex provides an area of zero electric field much like the hole in a doughnut (toroid). The optical gradient is radial with the highest electric field at the circumference of the doughnut. The optical vortex detains a small particle within the hole of the doughnut. The detention is accomplished by slipping the vortex over the small particle along the line of zero electric field.

The optical bottle differs from an optical vortex in that it has a zero electric field only at the focus and a non-zero electric field at an end of the vortex. An optical bottle may be useful in trapping atoms and nanoclusters which may be too small or too absorptive to trap with an optical vortex or optical tweezers. J. Arlt and M. J. Padgett. "Generation of a beam with a dark focus surrounded by regions of higher intensity: The optical bottle beam," Opt. Lett. 25, 191-193, 2000.

The optical rotator is a recently described optical tool which provides a pattern of spiral arms which trap objects. Changing the pattern causes the trapped objects to rotate. L. Paterson, M. P. MacDonald, J. Arlt, W. Sibbett, P. E. Bryant, and K. Dholakia, "Controlled rotation of optically trapped microscopic particles," Science 292, 912-914, 2001. This class of tool may be useful for manipulating non-spherical particles and driving MEMs devices or nano-machinery.

The light cage, described by Neal in U.S. Pat. No. 5,939,716, is loosely, a macroscopic cousin of the optical vortex. A light cage forms a ring of optical vortices to surround a particle too large, too reflective, or with dielectric constants lower than the surrounding media. If the optical vortex is like a doughnut, the light cage is like a jelly-filled doughnut. While the doughnut hole (for the vortex) is an area of zero electric field, the jelly-fill is an area of lowered electric field. In a gross sense, the gradient forces of the plurality of optical tweezers forming the doughnut "push" a particle, with a dielectric constant lower than the surrounding medium, towards the jelly-fill which may also be thought of as the less bright region which lies between the plurality of optical tweezers. However, unlike a vortex, no-zero electric field area is created.

Using a single beam of laser light with a diffractive optical element to form a plurality of diffracted laser beams focused to form an array of optical traps is known in the art. U.S. Pat. No. 6,055,106 issued to Grier and Dufresne describes arrays of optical traps. The patent teaches the use of physical transfer lenses to direct a diffracted laser beam to the back aperture of a focusing lens. Multiple physical lenses are employed to direct and overlay the laser beams at the back aperture of a focusing lens with sufficient overlap to achieve an effective numerical aperture (NA) of at least about 0.8, which, as taught in U.S. Pat. No. 5,079,169 issued to Chu and Kronis, is considered the minimum NA necessary to trap and manipulate particles in three dimensions. It is a drawback of the apparatus described in U.S. Pat. No. 6,055,106 that each lens requires a relatively large amount of physical space to operate within and each lens must be maintained, cleaned and aligned. Those familiar with transfer lens systems will recognize that the greater the number of lenses in the system the more opportunity for misalignment and other maintenance problems. Accordingly, there has existed a need to reduce the number of lenses in a transfer lens system used for forming an array of optical traps. The present invention satisfies this need.

A common modality for monitoring the activity of an optical trap described in U.S. Pat. No. 6,055,106 is to place a beam splitter in the pathway of the laser beam and thereby yield an optical data-stream. One limitation of this modality is the detrimental effect on the optical data stream of noise. In the context of optical traps, noise refers to the interference with the imaging, measuring and/or viewing of the optical traps, their contents, or the surrounding region resulting from the presence in the system of un-diffracted focused beam of light or energy, light emanating from the optical traps, and light reflected or diffracted off a lens in a physical transfer lens system either due to imperfections in the lens, dust, dirt or due to misalignment. As taught in U.S. Pat. No. 6,055,106, one way to reduce noise is to direct the laser beam at an oblique angle relative to the diffractive element thereby urging the un-diffracted beam away from the objective lens. While useful for its intended purposes, the other sources of noise remain. There exists a need for reduction or elimination of the noise caused by the un-diffracted laser beam, scattered and reflected laser light off the components of a system producing an array of optical traps. The present invention also satisfies this need and other needs and provides related advantages.

SUMMARY OF THE INVENTION

The present invention provides a novel and improved method, system and apparatus for generating, monitoring and controlling optical trap arrays employing but a single physical transfer lens. The within invention also improves monitoring and control of optical traps by filtering out, or shutting off, the "noise" caused by scattered, un-diffracted and reflected light within the system.

Multiple transfer lenses are eliminated or reduced, in a system producing a plurality of optical traps, by encoding a lens function into a diffractive optical element. The diffractive optical element may also alter the phase of any of the beams. By encoding the diffractive optical element to converge the plurality of beams, the invention creates conditions favorable to use a single physical lens to transfer and overlay the plurality of beams at the back aperture of the objective lens and to form optical traps there-through.

In a basic form, the invention (FIG. 1A) is a focused beam of light or energy, such as single laser beam diffracted by a diffractive optical element which has an encoded lens function. The laser beam is diffracted into a plurality of beams and each beam is also converged by the diffractive optical element which then directed to a single transfer lens which in turn directs and overlaps the plurality of beams at the back aperture of a focusing lens (such as the objective lens of a microscope) thereby forming a plurality of optical traps. To alter the position of a given optical trap, the beam forming that trap may be steered to a new position, via the diffractive optical element, thereby altering the position of the optical trap resulting therefrom. A moving mirror may be added (FIGS. 1D, 1E, 2 and 4) to simultaneously alter the position of all the optical traps as a unit. In some cases, movement of the single transfer lens may also be desirable to alter the position of the given optical trap.

The selective generation and control of the array of optical traps with a single lens transfer system may be useful in a variety of commercial applications, such as, optical circuit design and manufacturing, nanocomposite material construction, fabrication of electronic components, optoelectronics, chemical and biological sensor arrays, assembly of holographic data storage matrices, energy source or optical motor to drive MEMS, facilitation of combinatorial chemistry, promotion of colloidal self-assembly, manipulation of biological materials, interrogating biological material, concentrating selected biological material, investigating the nature of biological material, and examining biological material.

In some embodiments of the invention (FIGS. 2 and 4) real time viewing of the activity of the optical trap array is enabled by placing a beam splitter in the path of the beams prior to the focusing lens and then introducing a filter to limit the passage of un-diffracted, scattered or reflected light along the optical data stream thus reducing this noise which can disrupt video or other monitoring of the optical data stream. A moving mirror, useful to adjust the position of the whole array of optical traps, may also be combined with the beam splitter (FIGS. 2 and 3) or added to the system (FIG. 4).

Noise reduction may also be achieved by periodically shuttering off the laser light (FIG. 3) and monitoring the optical data stream and/or by shuttering off the optical data stream when the laser is on.

Other features and advantages of the present invention will be set forth, in part, in the descriptions which follow and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appendent claims.

DETAILED DESCRIPTION OF THE PREFERRED EMBODIMENTS

Certain terminology will be used in the following specification, for convenience and reference and not as a limitation, brief definitions are provided below:

A. "Beamlet" refers to a sub-beam of focused light or other source of energy that is generated by directing a focused beam of light or other source of energy, such as that produced by a laser or collimated output from a light emitting diode, through a media which diffracts it into two or more sub-beams. An example of a beamlet would be a higher order laser beam diffracted off of a grating.

B. "Phase profile" refers to the phase of light or other source of energy in a cross-section of a beam.

C. "Phase patterning" refers to imparting a patterned phase shift to a focused beam of light, other source of energy or beamlet which alters its phase profile, including, but not limited to, phase modulation, mode forming, splitting, converging, diverging, shaping and otherwise steering a focused beam of light, other source of energy or a beamlet.

Figure 1A:
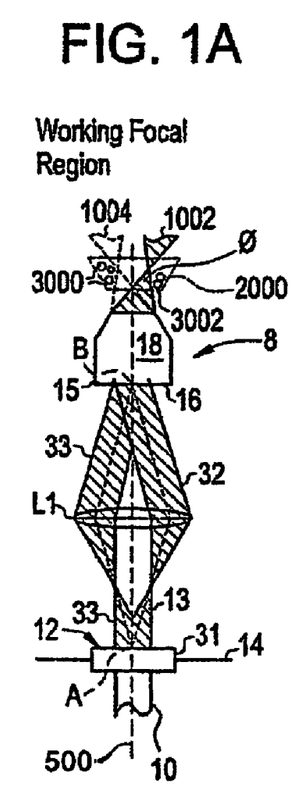
FIG. 1A illustrates a system for manipulating an array of small particles.
Figure 1B:
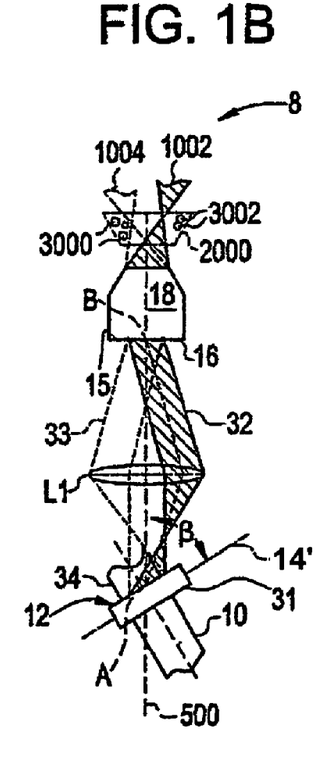
FIG. 1B illustrates a first alternate system for manipulating an array of small particles.
Figure 1C:
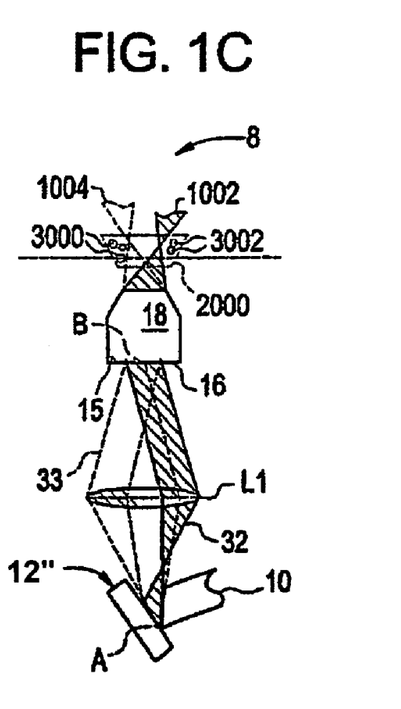
FIG. 1C illustrates a second alternate system for manipulating an array of small particles with a reflective diffractive optical element.

Various embodiments of the inventive apparatus for forming a plurality of movable optical traps, generally designated as 8, are shown in FIGS. 1A, 1B and 1C. In the embodiment shown in FIG. 1A, a movable array of optical traps is formed by generating a focused beam of energy, such as electromagnetic wave energy. In preferred embodiments, the electromagnetic waves are light waves, preferably having a wavelength of from about 400 nm to about 1060 nm, and more preferably having a wavelength in the green spectrum. The beam is formed of a collimated light, such as the collimated output from a light emitting electrode or, preferably, a laser beam 10, as shown in FIGS. 1A-E.

The focused beam of light is directed along optical axis 500 through a phase patterning optical element having a variable optical surface, such as a diffractive optical element 12 having a variable optical surface disposed substantially in a plane conjugate to a planar surface 15 of a back aperture 16 of a focusing lens, such as an objective lens 18, to produce a plurality of beamlets 32 and 33 (two shown) having a selected phase profile. Varying the optical surface of the diffractive optical element alters the beamlets.

Encoded in the diffractive optical element 12 is a virtual lens that converges the plurality of beamlets at a position between the encoded diffractive optical lens and a single transfer lens. The beamlets emanating from the encoded diffractive optical element, after converging, are directed through a transfer lens so as to overlap the beamlets at the back aperture of a focusing lens, such as an objective lens 18. The beamlets are then converged by the focusing lens to form a plurality of optical traps 1002 and 1004 in working focal region 2000. The working focal region 2000 in that area where a media containing particles 3000 or other material 3002 to be examined, measured or manipulated by the optical traps 1002 and 1004 is placed.

Any suitable laser can be used as the source of the laser beam 10. Useful lasers include solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 5 W are preferred.

When the focused beam of light 10 is directed through the encoded diffractive optical element 12, the encoded diffractive optical element produces a plurality of diffracted beamlets 32 and 33 having an altered phase profile. Depending on the type of optical trap desired, the alteration may include wavefront shaping, phase shifting, steering, diverging and converging to form different classes of optical traps including optical tweezers, optical vortices, optical bottles, optical rotators, light cages, and combinations of the different classes. For clarity, only two diffracted beamlets and two corresponding optical tweezers 1002 and 1004 are shown, but it should be understood that an array of such beamlets are created by the encoded diffractive optical element.

The location of each trap is selectively controlled by the encoded diffractive optical element. It is a significant feature of the invention that movement of each trap, be it rotation in a fixed position, rotation in a non-fixed position, two-dimensional and three dimensional, continuous and stepped is selectively controllable. The control is achieved by varying the surface of the diffractive optical element through which the beam passes, thereby altering the position of convergence of the beamlets emanating from the encoded diffractive optical element.

Suitable diffractive optical elements are characterized as transmissive or reflective depending on how they direct the focused beam of light. Transmissive diffractive optical elements, as shown in FIGS. 1A and 1B, focus the beam of light, while reflective diffractive optical elements, as shown in FIG. 1C, reflect the beam.

Within the two general groups, a diffractive optical element can be categorized as being formed from either static or dynamic media. Examples of suitable static diffractive optical elements include diffractive optical elements with a fixed surface, such as gratings, including diffraction gratings, reflective gratings, transmissive gratings, holograms, stencils, light shaping holographic filters, polychromatic holograms, lenses, mirrors, prisms, waveplates and the like.

The static diffractive optical element may have different regions, each region configured to impart a different phase profile to the beamlets. In such embodiments, the surface of the static diffractive optical element can be varied by moving the surface relative to the laser beam 10 to select the appropriate region to change the desired characteristics imparted to the beamlets, i.e., to change the desired phase profile of at least one of the resulting beamlets. In some embodiments, the static surface contains two or more discreet non-homogeneous regions. In alternative embodiments, the static surface is substantially continuously varying.

Examples of suitable dynamic diffractive optical elements having a time dependent aspect to their function include variable computer generated diffractive patterns, variable phase shifting materials, variable liquid crystal phase shifting arrays, micro-mirror arrays, piston mode micro-mirror arrays, spatial light modulators, electro-optic deflectors, accousto-optic modulators, deformable mirrors, reflective MEMS arrays and the like. With a dynamic diffractive optical element, the features of the encoded surface can be altered, for example, by a computer, to effect a change in the number of beamlets, the phase profile of at least one of the beamlets, and the location of at least one of the beamlets.

The virtual lens encoded on the diffractive optical element alters the phase of light incident on the optical element. A representative virtual lens is a pattern similar to a Fresnel lens encoded, for example, in the orientation of a reflective grating or nematic liquid crystals. The virtual lens is distinguishable from a physical lens, which affects all the beamlets 32 and 33 as a whole, as the virtual element can alter the relative position of each beamlet 32 and 33 independently.

The diffractive optical element is also useful to impart a particular topological mode to the laser light. Accordingly, one beamlet 32 may be formed in a Guass-Laguerre mode while another beamlet 33 is formed in a Guassian mode.

Preferred virtual lens-encoded diffractive optical elements include phase-only spatial light modulators such as the "PAL-SLM series X7665, manufactured by Hamanmatsu of Japan or the "SLM 512SA7" manufactured by Boulder Nonlinear Systems of Layfette, Colo. These encoded diffractive optical elements are computer controllable and multifunctional, so that they can generate the beamlets 32 and 33 by diffracting the laser beam 10 and selectively impart desired characteristic to the resulting beamlets.

Each of the diffracted beamlets emanates from an area A on the front surface 13 of the encoded diffractive optical element and each must also pass through an area B, on the back aperture 16, thereby the beamlets are overlapping at the back aperture 16 of the objective lens 18. In the embodiment shown in FIG. 1, near precise overlapping is efficiently accomplished by combining the virtual lens encoded diffraction optical element with a single, movable downstream optical lens L1.

The laser beam 10 preferably has a beam diameter w which substantially coincides with the diameter of the back aperture 16 and it is an advantage of the inventive system that there is little or no overfill of the back aperture 17 of the objective lens 18 both conserving the intensity of the laser beam 10 and preserving the strength of the electrical field gradient creating effective optical traps 1002 and 1004 in the desired pattern within the working focal region 2000.

Stated in mathematical terms: If the effective NA to establish gradient forces sufficient to form an optical trap is 0.8 and if the effective NA is calculated from the formula $NA = n^* \sin \phi/_2$, wherein n represents the index of refraction for the medium outside of the objective lens and $\phi$ is the angle of convergence for the diffracted beams and if an oil immersion objective lens having an index of refraction as high as 1.5 is used, then to maintain an effective NA of 0.8, φ should be maintained at least 66 degrees during movement of the optical trap in order to form and maintain an optical trap effective to manipulate particles in three dimensions.

Alternatively, it is possible to form an effective optical trap without filling the back aperture 16, if an oversized focusing lens having an oversized back aperture, relative to the laser beam 10, is used. However, such a lens would require greater physical space and may be more costly.

Turning to the alternative embodiment shown in FIG. 1B, the controllable array of optical traps is formed by passing the laser beam 10 though a diffractive optical element 12 encoded with a virtual lens that is disposed substantially in a plane 14' forming an acute angle β relative to the optical axis 500. In this embodiment, beamlets 32 and 33 emanating from Area A on the front surface of the encoded diffractive optical element are directed by the diffractive optical element so as to pass through area B on the back aperture 16 of the objective lens 18 and form optical traps 1002 and 1004 in the working focal region 2000. By altering the position of the laser beam 10 relative to the optical axis 500, a portion of the un-diffracted light 34 is removed which in turn reduces the noise caused by the un-diffracted light 34 thereby improving efficiency and effectiveness of forming optical traps 1002 and 1004. Additionally, non-movable optical traps (not shown) which may form from an un-diffracted portion of the laser beam when the laser beam is directed along the optical axis as shown in FIGS. 1A and 1C is eliminated.

FIG. 1C illustrates an alternative embodiment where the controllable array of optical traps is formed by reflecting the laser beam 10 off a diffractive optical element 12" having an encoded virtual lens.

Figure 1D:
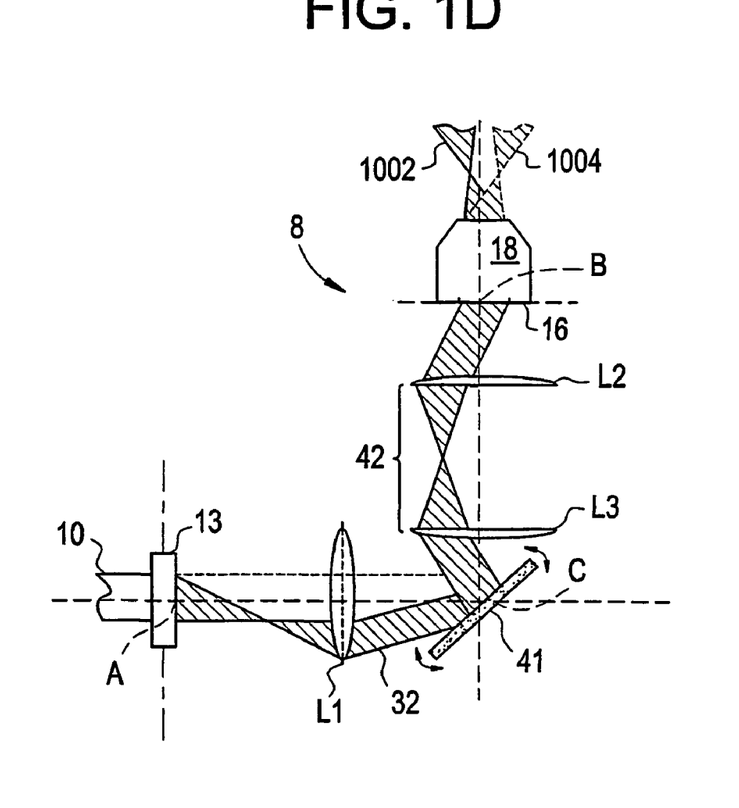
FIG. 1D illustrates a third alternate system for manipulating an array of small particles with a movable mirror.
Figure 1E:
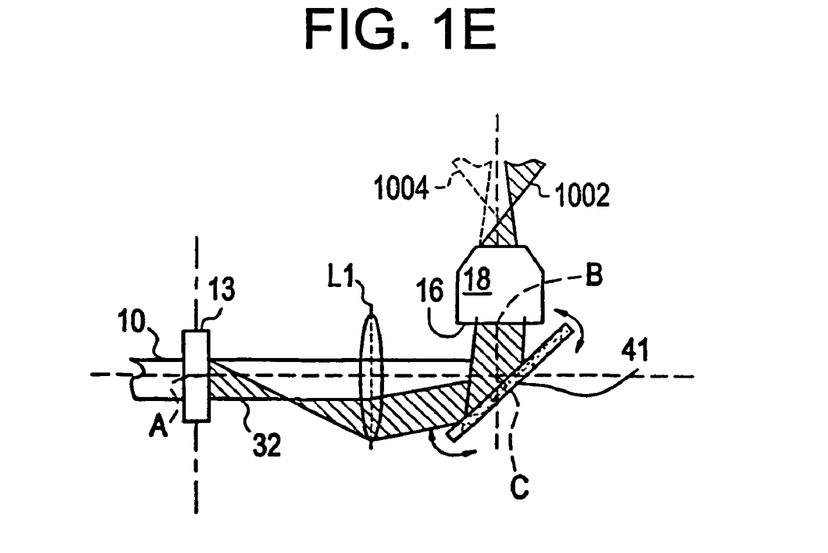
FIG. 1E illustrates a fourth alternate system for manipulating an array of small particles with a movable mirror.

FIGS. 1D and 1E show alternative embodiments having a movable mirror 41 for steering the beamlets emanating from the phase patterning optical element as a group prior to overlapping the beamlets at the back aperture of the focusing lens. The movable mirror 41 is disposed upstream of the transfer lens L1 with its center of rotation at area C. The representative beamlet 32 passes from area A on the front surface 13 of the encoded diffractive optical element 12 through the transfer lens L1 and on to area C which reflects it to area B at the back aperture 16. Tilting the movable mirror 41 effects a change of the angle of incidence of the beamlet 32 relative to the mirror 41 and can be used to translate the array of optical traps 1002 and 1004.

This movable mirror is useful for both precisely aligning the optical trap array within a stationary substrate, to dynamically stiffen the optical traps through small-amplitude rapid oscillatory displacements, and to effectively increase the trapping action by precisely altering positions of the array of optical traps while pulsing the optical traps to form two or more alternating sets of optical traps from the same number of beamlets.

The embodiment shown in FIG. 1D minimizes beamlet misalignments by including a conventional telescope system 42 disposed between the movable mirror 41 and the objective lens 18. The telescope system is constructed of two lenses L2 and L3 placed between conjugate planes 43 and 45, such that the beamlets pass from area A on the front surface 13 of the encoded diffractive optical element 12 on to the center of rotation of beam splitter 51 at area C in plane 43, and then through area B on the back aperture 16 of the objective lens 18 in plane 44. In the embodiment shown in FIG. 1E, the movable mirror 41 is placed in close proximity to the back aperture 16 in order to minimize beamlet misalignments.

Figure 2:
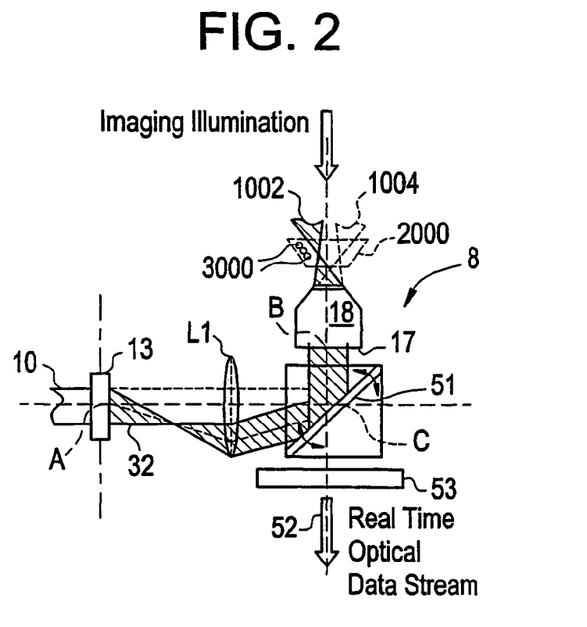
FIG. 2 illustrates a fifth alternate system for manipulating an array of small particles adapted for real time and noise free viewing.
Figure 3:
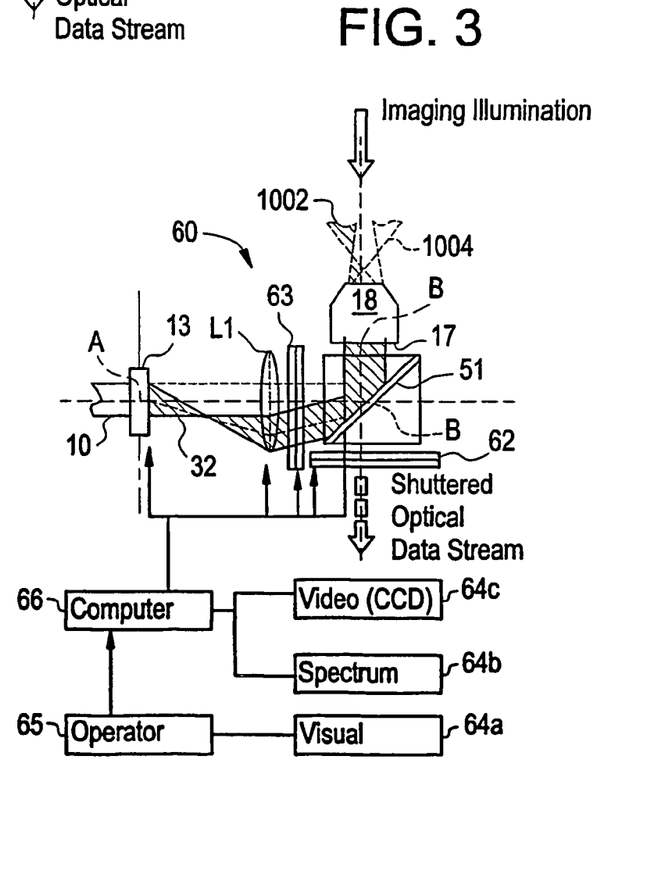
FIG. 3 illustrates a sixth alternate system for manipulating an array of small particles adapted for real time and noise free viewing.
Figure 4:
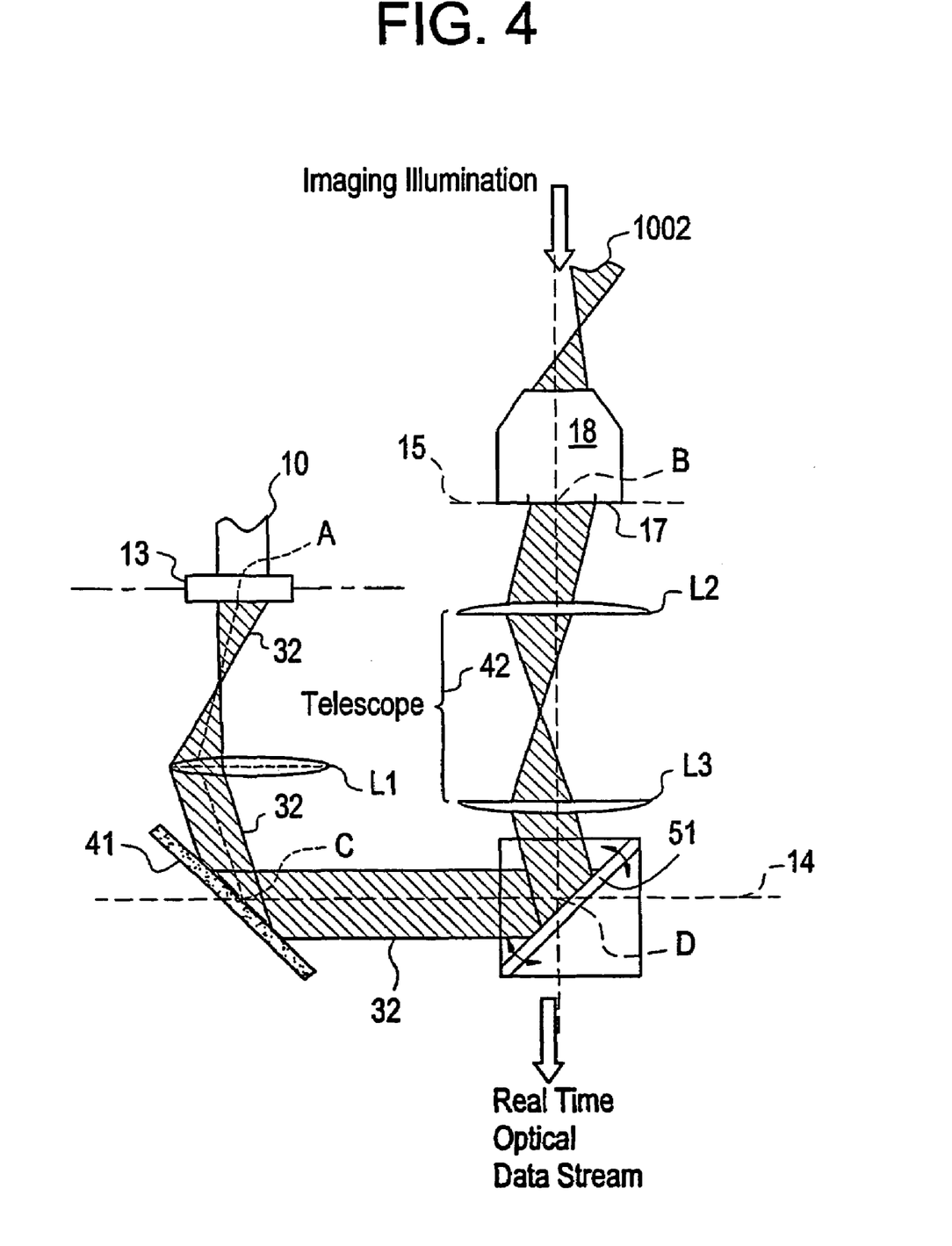
FIG. 4 illustrates a seventh alternate system for manipulating an array of small particles adapted for real time viewing.

Using the embodiment of the invention shown in FIGS. 2 and 3, real time viewing of an optical data stream of the optical traps 1002 and 1004 interacting with small particles 3000 within the working focal region 2000 is possible. The movable array of optical traps 1002 and 1004 are formed using a single lens transfer optic L1. Only one beamlet 32 is shown for clarity, but it should be understood that a plurality of such beamlets are created by the optical element 12.

To produce the array of optical traps, the laser beam 10 passes through the diffractive optical element 12 to produce the beamlet 32 which emanates from area A on the front surface 13 of the encoded diffractive optical element 12 then passes on to area C. Area C is the center region on the surface of a beam splitter 51 located before the objective lens 18. The beam splitter 51 is constructed of a static or a movable dichroic mirror, a static or a movable photonic band gap mirror, a static or a movable omnidirectional mirror, or other similar device. The beam splitter shown in FIG. 2 is movable and, therefore, serves the dual function of movable mirror and beam splitter. In the alternative embodiment shown in FIG. 3, the beam splitter 51 is fixed.

The beam splitter 51 selectively reflects the wavelength of light used to form the optical traps and transmits other wavelengths to form two streams of beamlets. Thus, as seen in FIGS. 2 and 3, the first stream of beamlets proceeds from area C through area B at the back aperture 16 of the objective lens 18 thereby effectively overlapping all the beamlets at the back aperture and forming the optical traps 1002 and 1004. The second stream of beamlets is reflected by the beam splitter 51 to a monitor and used to provide a real time optical data stream, aided by an imaging illumination source (not shown). The second stream of beamlets passes through the apparatus 8 to be visually inspected 64a by a human monitor 65. The monitor 65 may also interface with a computer 66 and cause the computer to effect changes in the parameters of the system to alter the position of the position of one or all of the beamlets 32.

Alternatively, a spectrum 64b of the optical data stream can be obtained, then analyzed and/or the optical data stream can be converted into a video signal and monitored with a video monitor 64c. In some embodiments, the optical data stream is passed through a spectrometer and the position of the convergence of at least one beamlet is then altered in response to an analysis of the spectrum or the video monitoring to change the location of the corresponding optical trap(s).

Spectroscopy 64b of a sample of biological material can be accomplished with an imaging illumination suitable for either inelastic spectroscopy or polarized light back scattering, the former being useful for assessing chemical structure and the later being suited for measuring nucleus size. The computer 66 analyzes the data to identify suspected cancerous, pre-cancerous and/or non-cancerous cells, and directs the optical array to segregate and concentrate a sample of the selected cell types. Those skilled in the art will recognize that the methodology used to concentrate cells based on parameters specific to cancerous cells may be altered without departing from the scope of the invention to identify and/or concentrate other types of cells based on other parameters. The wavelengths of the laser beam 10 used to form optical traps useful for manipulating biological material include the infrared, near infrared and visible wavelengths from about 400 nm to about 1060 nm.

In still other embodiments, the optical data stream may be received by a computer 66 adapted to record the optical data stream, analyze the optical data stream, and/or precisely adjust the position of one or all of the beamlet(s) 32 via the diffractive optical element 13, the position of the single transfer lens L1, and/or the position of the movable beam splitter 51. Alternatively, the optical data stream may be processed by a photodectector to monitor intensity, or any suitable device to convert the optical data stream to a digital data stream adapted for use by a computer 66.

The real time optical data stream provides more useful information if the noise is controlled. As seen in FIG. 2, a filter element 53, such as a polarizing element or band pass element, is placed within the pathway of the optical data stream to reduce the amount of reflected, scattered or un-diffracted laser light 10 passing along the axis of the optical data stream. The filter element 53 filters out one or more preselected wavelengths and, in some embodiments, all but a preselected wavelength of the optical data stream.

Another method of limiting the noise in the optical data stream is to shutter, or pulse, the optical data stream. FIG. 3 illustrates a system of controllable shutters 62 and 63. One advantage of shutters is to eliminate substantially all of the noise or interference from the optical data stream. The shutter 62 selectively blocks and unblocks the optical data stream from passing freely from the system by coordinating its opening with the turning on and off of the laser beam 10. When the laser beam is not being generated, the optical data stream is blocked and when focused beam of light is being generated, the optical data stream is unblocked. To maintain control of the small particles (not shown) within the optical traps when shuttering the laser beam 10 (which in-turn will cause the beamlet(s) 32 and the resulting optical trap(s) 1002 to switch "on" and "off") the pulse rate of the shutter is adjusted dependent on the nature of the particles being manipulated. However, too slow a pulse rate will allow the trapped particles to drift. For those situations in which drift is desired, the pulse rate may be adjusted to encourage drift.

Alternatively, the shutter 63 blocks the laser beam (not shown) or the beamlets from passing freely into the objective lens. By coordinating the opening and closing of the shutter 63 with the turning "on" and "off" of the monitoring of the optical data stream noise is reduced. In some instances, dual shuttering may be desirable. One advantage of dual shuttering is that both the laser beam 10 and the monitoring equipment can remain "on" at all times. In such an arrangement only the activity of the shutters 62 and 63 need be coordinated. The computer 66 may be used to selectively control the shutter(s) 62 and 63.

Shown in FIG. 4 is an embodiment useful where the availability of equipment, physical space limitations or other performance parameters will benefit from using a traditional telescope transfer lens system 42 placed in the system after the single transfer lens L1 combined with a moving mirror 41 and a beam splitter 51 to provide an optical data stream.

The apparatus 8 is useful as part of a system for manipulating a plurality of small particles. In addition to the apparatus, the system includes a light source (not shown) for producing the focused beam of light, the focused beam of light 10, and a plurality of small particles 3000 that are manipulated by the optical traps 1002 and 1004.

The plurality of optical traps created in accordance with the invention. In some embodiments, the optical traps form the gradient conditions necessary to manipulate biological material.

Since certain changes may be made in the above apparatus without departing from the scope of the invention herein involved, it is intended that all matter contained in the above description, as shown in the accompanying drawing, the specification, and the claims shall be interpreted in an illustrative, and not a limiting sense.

We claim:

1. A method of forming a plurality of movable optical traps, the method comprising:
   generating a beam of light;
   directing the beam of light at a phase patterning optical element having a variable optical surface to form a plurality of beamlets emanating from the phase patterning optical element, each beamlet having a phase profile;
   converging the beamlets emanating from the phase patterning optical element at a position between the phase patterning optical element and only a single transfer lens with the phase patterning optical element;
   directing the beamlets emanating from the phase patterning optical element through the single transfer lens to overlap the beamlets at the back aperture of a focusing lens; and
   converging the beamlets emanating from the focusing lens to form a plurality of optical traps.

2. The method of claim 1 further comprising altering the position of the convergence of at least one beamlet emanating from the phase patterning optical element by varying the optical surface to change the location of at least one optical trap.

3. The method of claim 1 wherein the optical traps are selected from the group consisting of optical tweezers, optical vortices, optical bottles, optical rotators, light cages, and combinations thereof.

4. The method of claim 3 further comprising changing the phase profile of at least one of the beamlets emanating from the phase patterning optical element by varying the optical surface.

5. The method of claim 1 further comprising manipulating biological material with the optical traps.

6. The method of claim 1 wherein the focused beam of light is a laser beam.

7. The method of claim 6 wherein the wavelength of the laser beam is in the visible spectrum.

8. The method of claim 6 wherein the wavelength of the laser beam is selected from the range of about 400 nm to about 1060 nm.

9. The method of claim 1 further comprising steering the beamlets emanating from the phase patterning optical element as a group prior to overlapping the beamlets at the back aperture of the focusing lens with a movable mirror.

10. A method of forming a plurality of movable optical traps, the method comprising:
    generating a focused beam of energy; directing the focused beam of energy at a phase patterning optical element having a variable optical surface to form a plurality of beamlets;
    converging the beamlets with the phase patterning optical element;
    directing the beamlets through only a single transfer lens to overlap the beamlets at the back aperture of a focusing lens; and
    converging the beamlets emanating from the focusing lens to a plurality of optical traps.

11. The method of claim 10 further comprising altering the convergence of at least one beamlet emanating from the phase patterning optical element by varying the optical surface to change the location of at least one optical trap.

12. The method of claim 10 further comprising forming two or more different classes of optical traps selected from the group consisting of optical tweezers, optical vortices, optical bottles, optical rotators, and light cages.

13. The method of claim 12 further comprising changing, with the phase patterning optical element, the phase profile of at least one of the beamlets.

14. The method of claim 10 wherein the focused beam of energy is electromagnetic wave energy.

15. A method of forming and monitoring a plurality of movable optical traps comprising:
generating a focused beam of light; directing the focused beam of light at a phase patterning optical element to form a plurality of beamlets emanating from the phase patterning optical element having a variable optical surface, each beamlet having a phase profile;
converging the beamlets emanating from the phase patterning optical element at a position between the phase patterning optical element and only a single transfer lens with the
phase
patterning optical element;
directing the beamlets emanating from the phase patterning optical element through a single transfer lens to overlap the beamlets at a surface of a beam splitter and to create two streams of beamlets, the beam splitter reflecting the first stream of beamlets to the back aperture of a focusing lens and reflecting the second stream of beamlets to form an optical data stream; and
converging the beamlets emanating from the focusing lens to form a plurality of optical traps.

16. The method of claim 15 further comprising altering the convergence of at least one beamlet emanating from the phase patterning optical element to change the location of at least one optical trap.

17. The method of claim 15 further comprising forming two or more different classes of optical traps selected from the group consisting of optical tweezers, optical vortices, optical bottles, optical rotators, and light cages.

18. The method of claim 17 further comprising changing, with the phase patterning optical element, the phase profile of at least one of the beamlets.

19. The method of claim 15 further comprising manipulating biological material with the optical traps.

20. The method of claim 15 wherein the focused beam of light is a laser beam.

21. The method of claim 20 wherein the wavelength of the laser beam is in the green spectrum.

22. The method of claim 20 wherein the wavelength of the single laser beam is selected from the range of about 400 nm to about 1060 nm.

23. The method of claim 15 further comprising steering the beamlets emanating from the phase patterning optical element as a group prior to overlapping the beamlets at the back aperture of the focusing lens with a movable mirror.

24. The method of claim 15 further comprising converting the optical data-stream to a video signal.

25. The method of claim 24 further comprising varying the optical surface to change the location of at least one optical trap in response to the video signal.

26. The method of claim 15 further comprising obtaining and then analyzing the spectrum of the optical data-stream.

27. The method of claim 26 further comprising varying the optical surface to change the location of at least one optical trap in response to the analyzed spectrum of the optical data steam.

28. The method of claim 15 further comprising receiving the optical data-stream with a computer.

29. The method of claim 15 wherein the varying of the optical surface is directed with a computer.

30. The method of claim 15 further comprising filtering out all but a preselected wavelength of light from the optical data stream.

31. The method of claim 15 further comprising filtering out one or more preselected wavelengths of light from the optical data stream.

32. The method of claim 15 further comprising selectively generating the focused beam of light and selectively blocking and unblocking the optical data-stream, so that when the focused beam of light is not being generated, the optical data stream is blocked and when focused beam of light is being generated, the optical data stream is unblocked.

33. The method of claim 15 further comprising: selectively blocking and unblocking the beamlets emanating from the phase patterning optical element from passing to the beam splitter, and selectively monitoring the optical data-stream when blocking the beamlets.

34. An apparatus to produce at least two optical traps comprising:
a phase patterning optical element for receiving a focused beam of light and diffracting it into at least two beamlets, each beamlet having a phase profile;
a virtual lens encoded in the phase patterning optical element for converging each beamlet emanating from the phase patterning optical element at a position between the phase patterning optical element and only a single transfer lens;
the single transfer lens for directing the beamlets emanating from the phase patterning optical element to overlap the beamlets at the back aperture of a focusing lens;
the focusing lens for converging each beamlet emanating from the transfer lens to form the optical traps; and
a single transfer lens between the phase patterning optical element and the focusing lens which overlaps the beamlets at the back aperture of the focusing lens.

35. The apparatus of claim 34 wherein the single transfer lens is movable.

36. The apparatus of claim 34 wherein the phase patterning optical element has a static surface.

37. The apparatus of claim 36 wherein the static surface is repositionable to align different portions of the static surface to receive the beam of light.

38. The apparatus of claim 37 wherein the static surface is comprised of two or more discreet non-homogeneous regions.

39. The apparatus of claim 37 wherein the static surface is substantially continuously varying.

40. The apparatus of claim 36 wherein the phase patterning optical element is selected from at least one of the group consisting of gratings, diffraction gratings, reflective gratings, transmissive gratings, holograms, stencils, light shaping holographic filters, polychromatic holograms, lenses, mirrors, prisms, waveplates, and holograms.

41. The apparatus of claim 34 wherein the phase patterning optical element is dynamic.

42. The apparatus of claim 41 wherein selectively varying the encoded virtual lens changes the number of beamlets emanating therefrom.

43. The apparatus of claim 41 wherein selectively varying the encoded virtual lens changes the position of the convergence of at least one of the beamlets emanating therefrom.

44. The apparatus of claim 41 wherein selectively varying the phase patterning optical element changes the phase profile of at least one of the beamlets emanating therefrom.

45. An apparatus to produce and monitor at least two optical traps comprising:

a phase patterning optical element for receiving a focused beam of light and diffracting it into at least two beamlets, each beamlet having a phase profile;
a virtual lens encoded in the phase patterning optical element for converging each beamlet emanating from the phase patterning optical element at a position between the phase patterning optical element and only a single transfer lens;
the single transfer lens for directing the beamlets emanating from the phase patterning optical element to overlap at a back aperture of a focusing lens; and
a beam splitter for receiving the beamlets emanating from the single transfer lens to create two streams of beamlets, then to reflect the first steam of beamlets to the back aperture of the focusing lens and reflect the second stream of beamlets to form an optical data steam;
wherein the focusing lens converges each beamlet emanating from the beam splitter to form at least two optical traps.

46. The apparatus of claim 45 wherein the single transfer lens is movable.

47. The apparatus of claim 45 wherein the phase patterning optical element has a static surface.

48. The apparatus of claim 47 wherein the static surface is repositionable to align different portions of the static surface to receive the beam of light.

49. The apparatus of claim 48 wherein the static surface is comprised of two or more discreet non-homogeneous regions.

50. The apparatus of claim 48 wherein the static surface is substantially continuously varying.

51. The apparatus of claim 47 wherein the phase patterning optical element is selected from at least one of the group consisting of gratings, diffraction gratings, reflective gratings, transmissive gratings, holograms, stencils, light shaping holographic filters, polychromatic holograms, lenses, mirrors, prisms, waveplates, and holograms.

52. The apparatus of claim 45 wherein the phase patterning optical element is dynamic.

53. The apparatus of claim 52 wherein the dynamic phase patterning optical element is selectively variable whereby the number of beamlets emanating therefrom can be changed.

54. The apparatus of claim 52 wherein the dynamic phase patterning optical element is selectively variable whereby the position of the convergence of each separate beamlet emanating therefrom can be changed.

55. The apparatus of claim 52 wherein the dynamic phase patterning optical element can be selectively varied whereby the phase profile of each separate beamlets emanating therefrom can be changed.

56. The apparatus of claim 52 wherein the phase patterning optical element is selected from at least one of the group consisting of variable computer generated diffractive patterns, variable phase shifting materials, variable liquid crystal phase shifting arrays, micro-mirror arrays, piston mode micro-mirror arrays, spatial light modulators, electro-optic deflectors, accousto-optic modulators, deformable mirrors and reflective MEMS arrays.

57. The apparatus of claim 45 wherein the beam splitter is selected from at least one of the group consisting of stationary omnidirectional mirrors, stationary photonic band gap mirrors, stationary dichroic mirrors, movable omnidirectional mirrors, movable photonic band gap mirrors and movable dichroic mirrors.

58. The apparatus of claim 45 further comprising a movable mirror disposed upstream of the transfer lens for steering the beamlets emanating from the phase patterning optical element as a group prior to overlapping the beamlets at the back aperture of the focusing lens.

59. The apparatus of claim 58 further comprising a telescope lens system between the movable mirror and the focusing lens.

60. An apparatus to produce and monitor a plurality of optical traps comprising:
a dynamic diffractive optical element for receiving a single laser beam and diffracting it into at least two beamlets, each beamlet having a phase profile;
a Virtual lens encoded in the diffractive optical element for converging the beamlets emanating from the phase patterning optical element at a position between the phase patterning optical element and only a single transfer lens;
the single transfer lens for directing the beamlets emanating from the phase patterning optical element to overlap at aback aperture of a focusing lens; and
the beam splitter for receiving the beamlets emanating from the single transfer lens to create two streams of beamlets, then to reflect the first steam of beamlets to the back aperture of the focusing lens and reflect the second stream of beamlets to form an optical data stream;
wherein the focusing lens converges each beamlet emanating from the beam splitter to form at least two optical traps.

61. A system to produce a plurality of optical traps for manipulating small particles comprising:
a plurality of small particles;
a light source for producing a focused beam of light;
a focused beam of light;
a phase patterning optical element for receiving the focused beam of light and diffracting it into at least two beamlets, each beamlet having a phase profile;
a virtual lens encoded in the phase patterning optical element for converging each beamlet emanating from the phase patterning optical element at a position between the phase patterning optical element and only a single transfer lens;
the single transfer lens disposed between the phase patterning optical element and
a focusing lens through which each beamlet passes and is overlapped at the back aperture of the focusing lens; and
the focusing lens for converging each beamlet emanating from the transfer lens to form at least two optical traps each able to manipulate one of the plurality of small particles.

62. The system of claim 61 wherein the single transfer lens is movable.

63. The system of claim 61 wherein the optical traps move corresponding to the movement of the single transfer lens.

64. The system of claim 61 wherein the phase patterning optical element has a variable optical surface.

65. The system of claim 64 wherein the phase patterning optical element has a static surface.

66. The system of claim 65 wherein the static surface is movable to selectively align the focused beam of light with a selected area of the static surface.

67. The system of claim 66 wherein the static surface is comprised of two or more discreet non-homogeneous regions.

68. The system of claim 67 wherein the static surface is substantially continuously varying.

69. The system of claim 67 wherein the phase patterning optical element is selected from at least one of the group consisting of gratings, diffraction gratings, reflective gratings, transmissive gratings, holograms, stencils, light shaping holographic filters, polychromatic holograms, lenses, mirrors, prisms, waveplates, and holograms.

70. The system of claim 61 wherein the phase patterning optical element is dynamic.

71. The system of claim 61 wherein the phase patterning optical element is selected from at least one of the group consisting of variable computer generated diffractive patterns, variable phase shifting materials, variable liquid crystal phase shifting arrays, micro-mirror arrays, piston mode micro-mirror arrays, spatial light modulators, electro-optic deflectors, accousto-optic modulators, deformable mirrors and reflective MEMS arrays.

72. The system of claim 61 further comprising a computer to selectively vary the phase patterning optical element.

73. The system of claim 61 wherein at least some of the plurality of small particles are a biological material.

74. The system of claim 61 wherein the light source is a laser and the focused beam of light is a laser beam with a wavelength in the green spectrum.

75. The system of claim 61 wherein the light source is a laser and the focused beam of light is a laser beam with a wavelength selected from the range of about 400 nm to about 1060 nm.

76. The system of claim 61 further comprising a movable mirror to steer the beamlets emanating from the phase patterning optical element as a group prior to overlapping the beamlets at the back aperture of the focusing lens.

77. The system of claim 61 further comprising a telescope lens system downstream from the single lens and before the focusing lens.

78. The system of claim 61 wherein each optical trap is selected from the group consisting of optical tweezers, optical vortices, optical bottles, optical rotators and light cages.

79. A system for manipulating small particles using optical traps comprising:
a plurality of small particles;
a light source for producing a focused beam of light;
a focused beam of light;
a phase patterning optical element which receives the focused beam of light and diffracts it into at least two beamlets, each beamlet having a phase profile;
a virtual lens encoded in the phase patterning optical element which converges each beamlet emanating from the phase patterning optical element at a position between the phase patterning optical element and only a single transfer lens;
a beam splitter for receiving the beamlets emanating from the phase patterning optical element and creating two streams of beamlets and for reflecting the first stream of beamlets to overlap the back aperture of a focusing lens and reflecting the second stream of beamlets to form an optical data stream;
the single transfer lens disposed between the phase patterning optical element and the focusing lens through which each beamlet passes and is overlapped at the back aperture of the focusing lens;
at least two optical traps each able to manipulate one of the plurality of small particles;
and
a monitor for the optical data stream.

80. The system of claim 79 wherein the single transfer lens is movable.

81. The system of claim 80 wherein the optical traps move corresponding to the movement of the single transfer lens.

82. The system of claim 80 wherein the phase patterning optical element has a variable optical surface.

83. The system of claim 80 wherein the phase patterning optical element has a static surface.

84. The system of claim 83 wherein the static surface is movable to selectively align the focused beam of light with a selected area of the static surface.

85. The system of claim 83 wherein the static surface is comprised of two or more discreet non-homogeneous regions.

86. The system of claim 83 wherein the static surface is substantially continuously varying.

87. The system of claim 79 wherein the phase patterning optical element is selected from at least one of the group consisting of gratings, diffraction gratings, reflective gratings, transmissive gratings, holograms, stencils, light shaping holographic filters, polychromatic holograms, lenses, mirrors, prisms, waveplates, and holograms.

88. The system of claim 79 wherein the phase patterning optical element is dynamic.

89. The system of claim 79 wherein the phase patterning optical element is selected from at least one of the group consisting of variable computer generated diffractive patterns, variable phase shifting materials, variable liquid crystal phase shifting arrays, micro-mirror arrays, piston mode micro-mirror arrays, spatial light modulators, electro-optic deflectors, accousto-optic modulators, deformable mirrors and reflective MEMS arrays.

90. The system of claim 79 further comprising a computer to selectively control the dynamic phase patterning optical element.

91. The system of claim 79 wherein at least some of the plurality of small particles are biological material.

92. The system of claim 79 wherein the light source is a laser and the focused beam of light is a laser beam with a wavelength in the green spectrum.

93. The system of claim 79 wherein the light source is a laser and the focused beam of light is a laser beam with a wavelength selected from the range of about 400 nm to about 1060 nm.

94. The system of claim 79 further comprising a movable mirror to steer the beamlets emanating from the phase patterning optical element as a group prior to overlapping the beamlets at the back aperture of the focusing lens.

95. The system of claim 79 further comprising a telescope lens system downstream from the single lens and before the focusing lens.

96. The system of claim 79 wherein the monitor is a human monitor.

97. The system of claim 79 wherein the monitor is a video monitor.

98. The system of claim 79 further comprising converting the optical data-stream to a digital data-stream.

99. The system of claim 79 further comprising a spectrometer for producing a spectrum of the optical data-stream.

100. The system of claim 79 further comprising a computer for receiving a digital data stream obtained by converting the optical data-stream to a digital data stream.

101. The system of claim 79 further comprising a computer for receiving the optical data stream and processing it into a digital data stream and for changing the location of at least one of the optical traps based on the information in the optical data-stream.

102. The system of claim 79 further comprising a computer for directing a movable mirror to steer the beamlets emanating from the phase patterning optical element as a group prior to overlapping the beamlets at the back aperture of the focusing lens.

103. The system of claim 79 further comprising: a computer for analyzing the spectrum; and a computer for directing a movable mirror to steer the beamlets emanating from the phase patterning optical element as a group prior to overlapping the beamlets at the back aperture of the focusing lens.

104. The system of claim 79 further comprising a polarizing filter or a band pass filter placed within the pathway of the optical data-stream.

105. The system of claim 79 further comprising a shutter to selectively block the optical data-stream while the focused beam of light is on and unblock the optical data-stream when the focused beam of light is off.

106. The system of claim 79 further comprising a shutter to selectively block the focused beam of light when the optical data-stream is being monitored.

107. The system of claim 79 wherein the source for producing a focused beam of light is a laser and the focused beam of light is a laser beam.

108. The system of claim 79 further comprising: a first shutter to selectively block the laser beam when the optical data-stream is being monitored; and a second shutter to selectively block the optical data-stream while the laser beam is on and unblock the optical data-stream when the laser beam is off.

109. The system of claim 79 wherein each optical trap is selected from the group consisting of optical tweezers, optical vortices, optical bottles, optical rotators and light cages.

110. An optical system for monitoring and manipulating small particles comprising:
   a source of a single beam of focused energy;
   a single beam of focused energy;
   a dynamic diffractive optical element;
   a plurality of converged beamlets produced by directing the single beam at the optical element;
   a focusing lens; beamlets and reflecting the first steam of beamlets to overlap the back aperture of the focusing lens and reflecting the second stream of beamlets to form an optical data stream;
   a movable only single transfer lens disposed between the optical element and the beam splitter to direct that beamlets to the beam splitter;
   at least two optical traps formed by the convergence of the beamlets through the focusing lens; and
   a monitor for the optical data stream.

111. The system of claim 110 wherein the source of a single beam of focused energy is selected form the group consisting of solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, flash lamp-pumped YAG lasers, light emitting diodes, and light emitting diodes with integrated collimating elements.

112. The system of claim 110 wherein the focused beam of light is electromagnetic energy.

113. The system of claim 110 wherein the optical traps move corresponding to the movement of the single lens.

114. The system of claim 110 wherein a change in the location of an optical trap results from at least one change in the optical element.

115. The system of claim 110 wherein each optical trap is selected from the group consisting of optical tweezers, optical vortices, optical bottles, optical rotators and light cages.

116. A method of forming a plurality of movable optical traps, the method comprising:
   generating a focused beam of light;
   directing the focused beam of light at a phase patterning optical to form a plurality of beamlets emanating from the phase patterning optical element, each beamlet having a phase profile;
   converging the beamlets emanating from the phase patterning optical element at a position between the phase patterning optical element and only a single transfer lens with the phase patterning optical element;
   directing the beamlets emanating from the phase patterning optical element with a movable mirror through the single transfer lens to overlap the beamlets at the back aperture of a focusing lens; and
   converging the beamlets emanating from the focusing lens to form a plurality of optical traps.

117. The method of claim 116 further comprising moving the mirror to change the location of at least one optical trap.

118. The method of claim 116 wherein the optical traps are selected from the group consisting of optical tweezers, optical vortices, optical bottles, optical rotators, light cages, and combinations thereof.

119. The method of claim 116 further comprising manipulating biological material with the optical traps.

* * * * *

UNITED STATES PATENT AND TRADEMARK OFFICE
CERTIFICATE OF CORRECTION

| | | |
|---|---|---|
| PATENT NO. | : 7,324,282 B2 | Page 1 of 1 |
| APPLICATION NO. | : 10/701324 | |
| DATED | : January 29, 2008 | |
| INVENTOR(S) | : David Grier, Ward Lopes and Eric Dufresne | |

It is certified that error appears in the above-identified patent and that said Letters Patent is hereby corrected as shown below:

In the specification, Column 9, line 24, delete the word "not"

Column 9, line 25, between the words "is" and "being" insert the word --not--

In the claims, Column 12, line 10, delete the word "not"

Column 12, line 11, between the words "is" and "being" insert the word --not--

Signed and Sealed this

Twenty-second Day of July, 2008

JON W. DUDAS
*Director of the United States Patent and Trademark Office*